United States Patent [19]
Jung et al.

[11] Patent Number: 6,094,441
[45] Date of Patent: Jul. 25, 2000

[54] APPARATUS AND METHOD FOR CONTROLLING TRANSMISSION PARAMETERS OF HOME NETWORK STATIONS TRANSMITTING ON A TELEPHONE LINE MEDIUM

[75] Inventors: Kyongsoo Michael Jung, Fremont; Colin Nayler, Sunnyvale; Paul K. Jung, Foster City, all of Calif.

[73] Assignee: Advanced Micro Devices, Inc., Sunnyvale, Calif.

[21] Appl. No.: 09/182,988

[22] Filed: Oct. 30, 1998

[51] Int. Cl.⁷ .................................................. H04J 3/16
[52] U.S. Cl. .................................... 370/466; 370/470
[58] Field of Search .................................... 370/419, 420, 370/392, 249, 252, 466, 470; 375/222

[56] References Cited

U.S. PATENT DOCUMENTS

| | | | |
|---|---|---|---|
| 4,884,266 | 11/1989 | Pflaumer | 370/84 |
| 5,062,104 | 10/1991 | Lubarsky et al. | 370/466 |
| 5,432,776 | 7/1995 | Harper | 370/17 |
| 5,524,122 | 6/1996 | Lepitre et al. | 375/222 |
| 5,703,872 | 12/1997 | Boggs et al. | 370/252 |

FOREIGN PATENT DOCUMENTS

98/20649  5/1998  WIPO.

OTHER PUBLICATIONS

The Home Phoneline Networking Alliance: "Simple, High-Speed Ethernet Technology for the Home", White Paper; On–Line Jun. 1998 (pp 1–11) Internet Retrieval: www.homepna.org/docs/wpl.pdf, Nov. 25, 1998, pp. 5–6, p. 8, paragraph 1–p. 10, paragraph 4.

4 pp International Search Report, PCT/US99/10798 dated Oct. 30, 1998.

*Primary Examiner*—Salvatore Cangialosi

[57] ABSTRACT

A physical layer transceiver of a home network station connected to a telephone medium has an architecture enabling adaptation of detection circuitry based on received network signals to enable reliable recovery of data signals. The physical layer transceiver includes an input amplifier that amplifies network signals according to one of 128 gain settings set by a receiver gain control signal. A signal conditioning circuit includes an envelope detector configured for outputting an envelope of the amplified received signal, and an energy detector configured for outputting an energy signal of the amplified received signals. The envelope signal and the energy signal are supplied to slicer threshold circuits, configured for outputting noise, peak, data event and energy event signals based on noise threshold, peak threshold, data transition threshold, and energy threshold signals, respectively. A digital controller controls the input amplifier gain and the threshold values, and adjusts the gain and threshold values based on the noise event signal and the peak event signal within an access ID (AID) interval. A link controller monitors the number of errors in received data packets, and causes the media access controller and physical layer transceiver to output AID command packets that signal a transmitting station to reduce transmit data rate or increase transmit power to improve reception reliability on the telephone line medium.

7 Claims, 6 Drawing Sheets

APPARATUS AND METHOD FOR CONTROLLING TRANSMISSION PARAMETERS OF HOME NETWORK STATIONS TRANSMITTING ON A TELEPHONE LINE MEDIUM

FIELD OF THE INVENTION

The present invention relates to network interfacing, and more particularly, to methods and systems for controlling transmission of data between network stations connected to a telephone line.

DESCRIPTION OF THE RELATED ART

Local area networks use a network cable or other media to link stations on the network. Each local area network architecture uses a media access control (MAC) enabling network interface cards at each station to share access to the media.

Conventional local area network architectures use media access controllers operating according to half-duplex or full duplex Ethernet (ANSI/IEEE standard 802.3) protocol using a prescribed network medium, such as 10 BASE-T. Newer operating systems require that a network station to be able to detect the presence of the network. In an Ethernet 10 BASE-T environment, the network is detected by the transmission of a link pulse by the physical layer (PHY) transceiver. The periodic link pulse on the 10 BASE-T media is detected by a PHY receiver, which determines the presence of another network station transmitting on the network medium based on detection of the periodic link pulses. Hence, a PHY transceiver at Station A is able to detect the presence of Station B, without the transmission or reception of data packets, by the reception of link pulses on the 10 BASE-T medium from the PHY transmitter at Station B.

Efforts are underway to develop an architecture that enables computers to be linked together using conventional twisted pair telephone lines instead of established local area network media such as 10 BASE-T. Such an arrangement, referred to herein as a home network environment, provides the advantage that existing telephone wiring in a home may be used to implement a home network environment. However, telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard POTS telephones, and electrical systems such as heating and air conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak-to-peak voltage on the order of 10 to 20 millivolts, whereas network signals from another network station may have a value on the order of one to two volts. Hence, the amplitude and shape of a received pulse may be so distorted that recovery of a transmit clock or transmit data from the received pulse becomes substantially difficult.

SUMMARY OF THE INVENTION

There is a need for a network station having a physical layer transceiver capable of reliably recovering data from a received network signal on a telephone line medium.

There is also a need for a network station, receiving network signals from different network nodes on a telephone line medium, to minimize loss of data due to distortion caused by telephone wiring topology.

There is also need for an arrangement for a network station receiving network signals from network nodes on a telephone line medium to overcome distortion effects caused by the telephone line medium.

These and other needs are attained by the present invention, where a network station receiving data packets from different network stations on a telephone line medium selectively outputs a control packet, based on detected errors in the received data packets, that causes the different network stations to adjust transmission parameters for improved reception reliability.

According to one aspect of the present invention, a network station is configured for sending and receiving network signals between other network stations on a telephone line medium. The network station includes a media access transceiver configured for receiving first data packets from the telephone line medium and transmitting second data packets onto the telephone line medium at a selected output gain and transmission speed, the media access transceiver configured for detecting a presence of an error in the first data packets. The network stations also includes a link controller configured for causing the media access transceiver to output onto the telephone line medium a control data packet based on the detected errors in the first data packets reaching a prescribed threshold, the control data packet causing the other network stations to adjust transmission parameters for reduction of the errors in received data packets. The transmission of data packets onto the telephone line medium at selected output gain and transmission speed enable the network stations to adaptively control transmission parameters based on distortion effects caused by telephone line medium topology. Moreover, the outputting of a control data packets based on the detected errors enables a receiving network station to control the transmission parameters of the source network stations transmitting the data packets. Hence, a receiving network node can control the transmission parameters of a transmitting network node to improve reception reliability and minimize the occurrence of errors in the received data packets due to distortion effects caused by the telephone line medium.

Another aspect of the present invention provides a method in a network station of controlling transmission of data packets by other network stations via a telephone line medium. The method includes receiving the data packet from at least one of the other network stations via the telephone line medium, determining a number of errors detected in the received data packets within a prescribed time interval, and outputting onto the telephone line medium a control packet specifying a change in at least one selected transmission parameter for improved reception reliability, based on the number of errors exceeding a prescribed threshold.

Still another aspect of the present invention provides a method of transmitting data between first and second network stations connected to a telephone line medium. The method includes transmitting first data packets from the first network station onto the telephone line medium in accordance with transmission parameters including a first data rate and a first output power level, receiving the first data packets in the second network station from the telephone line medium and determining a number of errors detected in the received first data packets, transmitting a control data packet from the second network station onto the telephone line medium in response to the number of errors exceeding a prescribed threshold, and changing at least one of the transmission parameters by the first network station in response to the control data packet. The transmission of a control data packet in response to the number of errors exceeding a prescribed threshold enables a receiving network station to notify a transmitting network station of the presence an excessive number of transmission errors. Hence, the transmitting network station can adjust his transmission parameters to overcome distortion effects caused by the telephone line medium.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
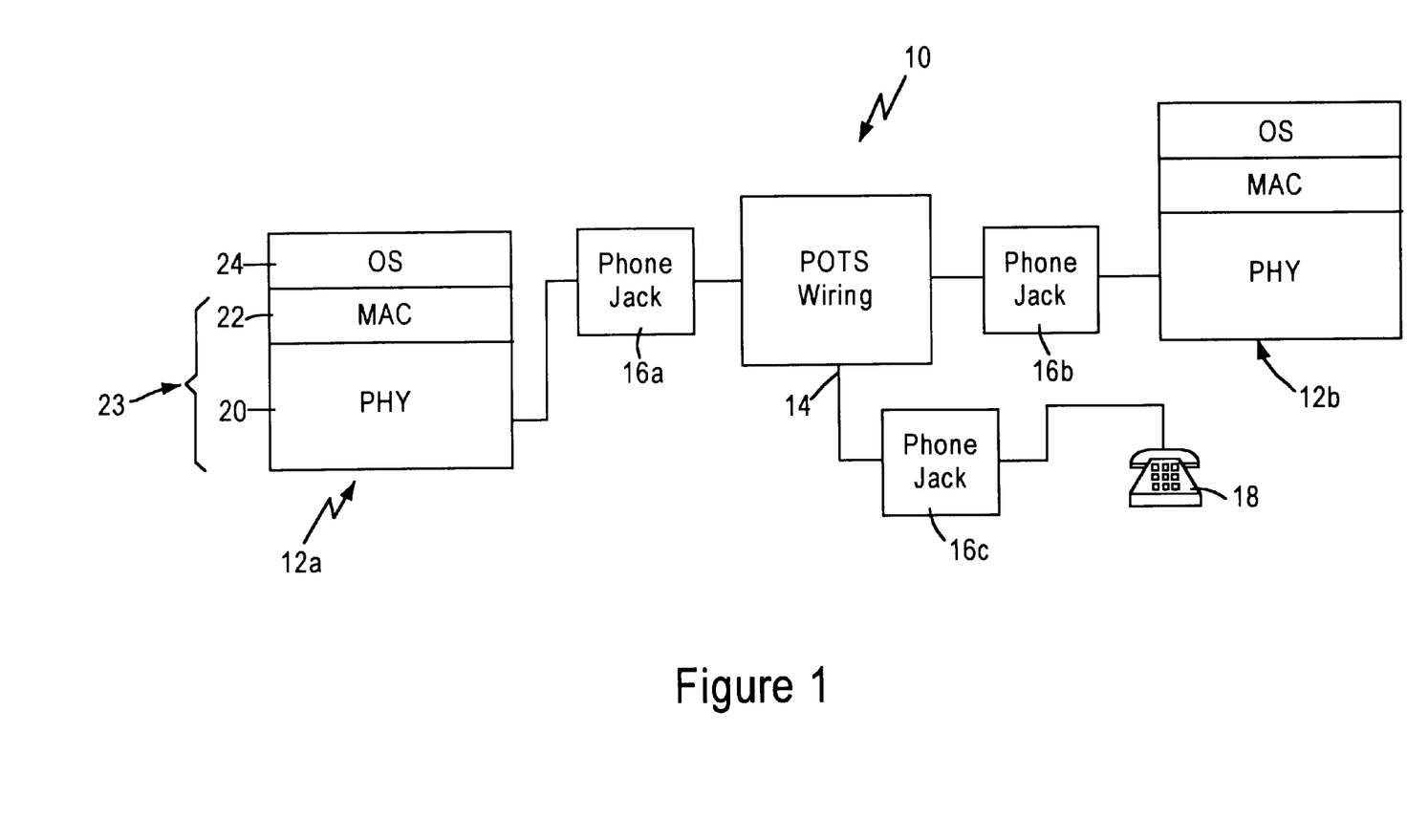
FIG. 1 is a block diagram illustrating a local area network deployed over residential twisted pair wiring.

FIG. 1 is a diagram of an Ethernet (IEEE 802.3) local area network 10 implemented in a home environment using twisted pair network media according to an embodiment of the invention. As shown in FIG. 1, the network 10 includes network stations 12a and 12b that are connected to a telephone line (twisted pair) wiring 14, via RJ-11 phone jacks 16a and 16b respectively. A telephone 18 connected to the RJ-11 phone jack 16c may continue to make phone calls while stations 12a and 12b are communicating.

As shown in FIG. 1, each network station 12, for example a personal computer, printer, or intelligent consumer electronics device, includes a physical layer (PHY) transceiver 20, a media access (MAC) layer 22, and an operating system (OS) layer that performs higher layer function according to the OSI reference model.

Figure 2A:
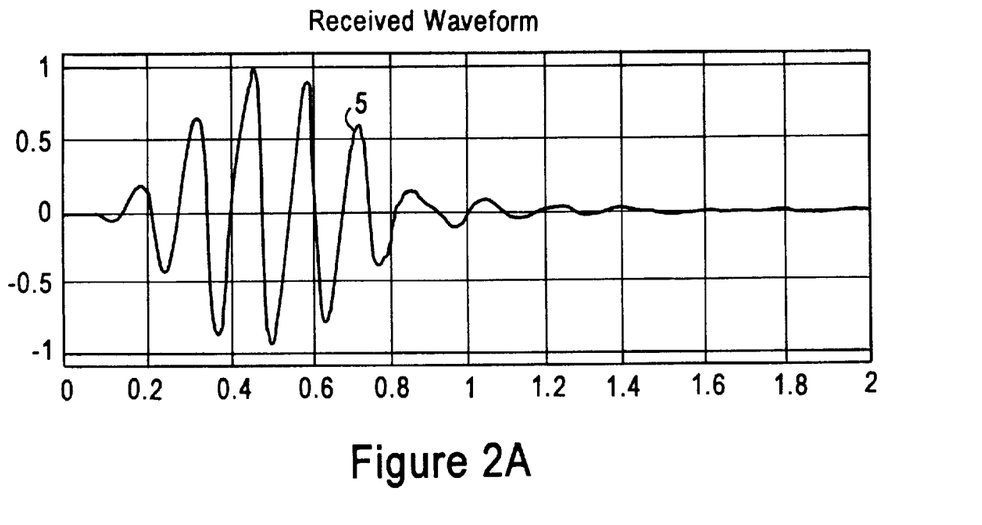
FIGS. 2A, 2B, 2C and 2D are diagrams illustrating processing of received waveforms by the physical layer transceiver of FIG. 1 according to an embodiment of the present invention.
Figure 2B:
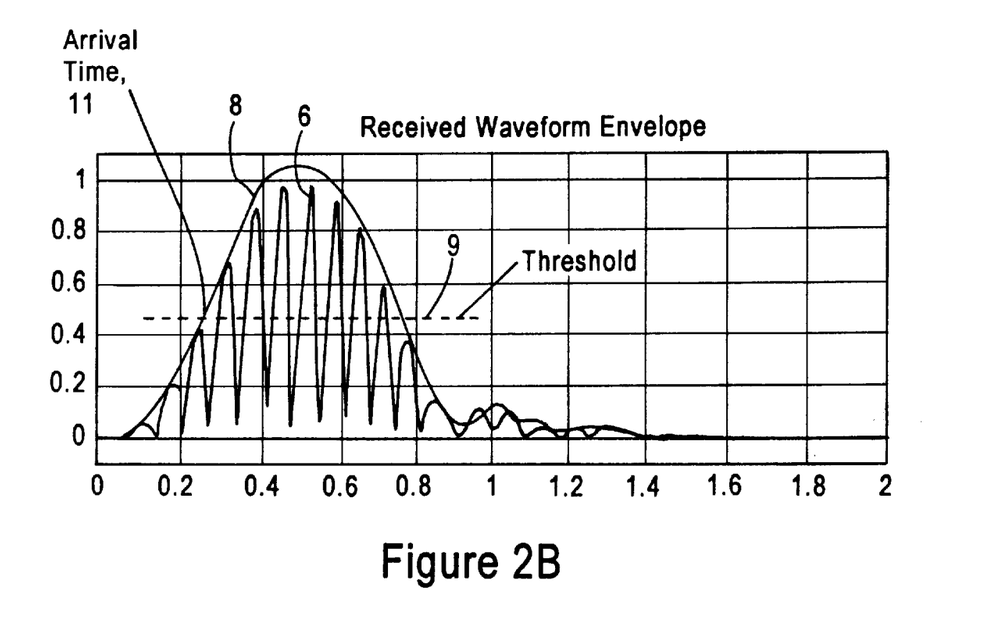

The stations 12a and 12b communicate by transmitting band limited pulses that carry network data modulated in the analog network signals. In particular, the physical layer transmitter transmits a band limited pulse 5, illustrated in FIG. 2A. The arrival position of a received pulse is detected using a waveform envelope 8 representing the absolute value 6 of the received signal, shown in FIG. 2B. The envelope 8 is supplied to a slicing circuit described below, having a threshold level 9 selected to identify the arrival position 11 of the received pulse. When the envelope 8 crosses the threshold level 9, the slicing circuit detects the arrival position 11 of the pulse as an event representing a data pattern. This event can be used to recover a transmit clock and transmit data from the received signal.

Figure 2C:
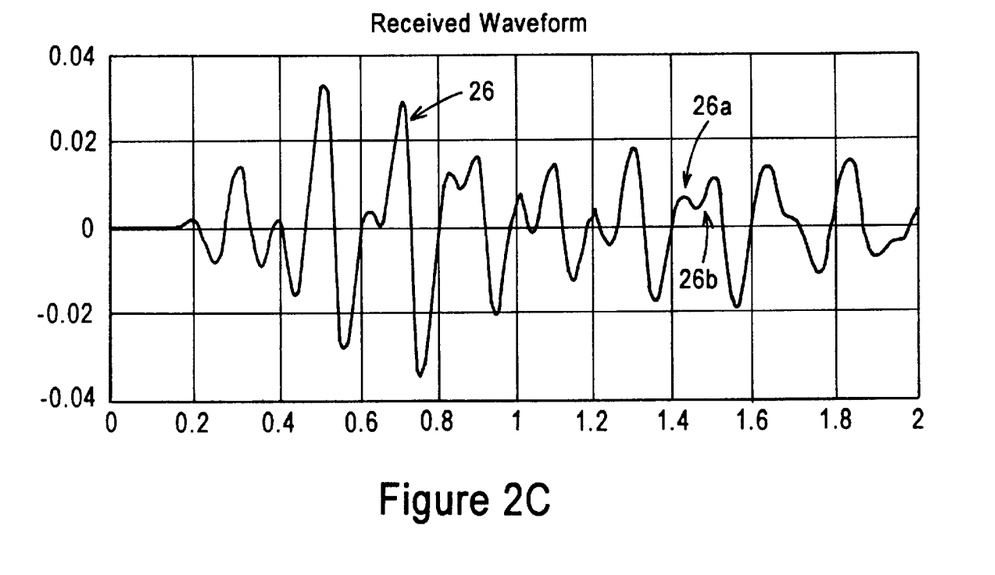
Figure 2D:
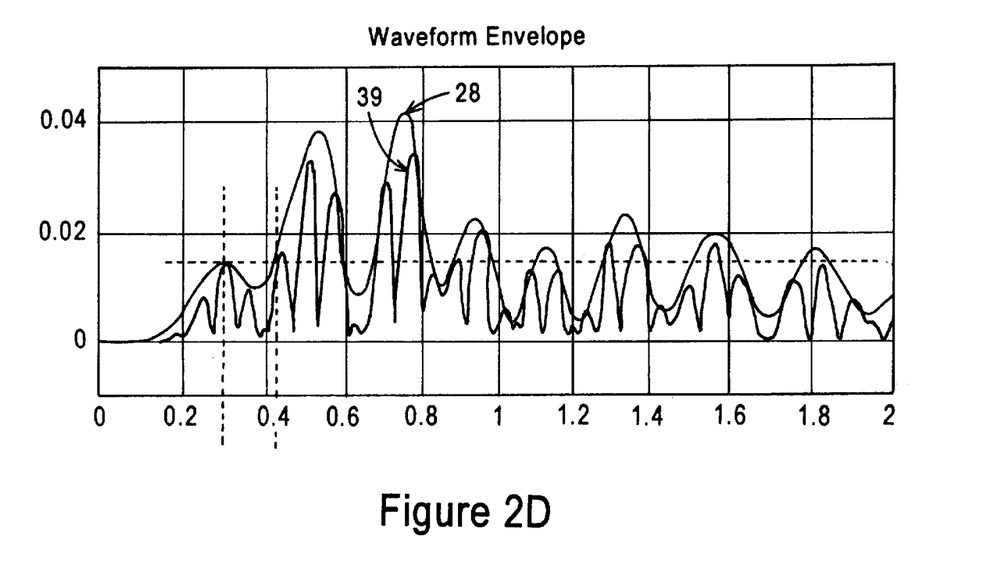

However, in telephone wire networks, the received envelope waveform depends largely on the wiring topology. As the wiring topology may cause multiple signal reflections, the shape of a received pulse may be so distorted that the envelope may have multiple localized maximum points. In addition, the wiring topology in the home network is variable. Hence the distortion of the received pulse is unpredictable, resulting in a waveform 26 as shown in FIG. 2C. As shown in FIG. 2C, the distorted waveform 26 of a received pulse signal has multiple localized maximum and minimum points 26a and 26b due to wiring topology. FIG. 2D illustrates the envelope waveform 28 of the distorted waveform 26. Hence, if a threshold value is not properly set for detection of a data pulse, a slicing circuit may identify multiple pulse positions at which crosses a threshold level. As a result, a unique time value for the position of a received pulse may not be detected resulting in data recover errors.

According to the disclosed embodiment, an adaptive physical layer transceiver architecture adaptively adjusts the signal processing circuitry on both the receive side and transmit side to optimize accurate recovery data from the transmitted network signals, and optimize transmitter performance to overcome adverse conditions due to home telephone wiring topology. In particular, the disclosed embodiment includes a link controller within the network station 12, for example control routines within the OS layer 24 executable by the host microprocessor or logic circuitry implemented in the OS layer 24 or the MAC 22. The link controller monitors the number of errors in received data packets and selectively controls the output of command packets onto the network 10, causing other network stations receiving the command packets to improve their respective transmission characteristics. The improvement of transmission characteristics, for example increasing an output amplifier gain or reducing a data transmission rate, enables the transmitted data packet to be more reliably received by a receiving network station, reducing the bit error rate of received data packets. An overview of the physical layer transceiver architecture will first be provided, followed by a description of the arrangement for controlling transmission levels in transmitting network stations.

PHYSICAL LAYER ARCHITECTURE

Figure 3:
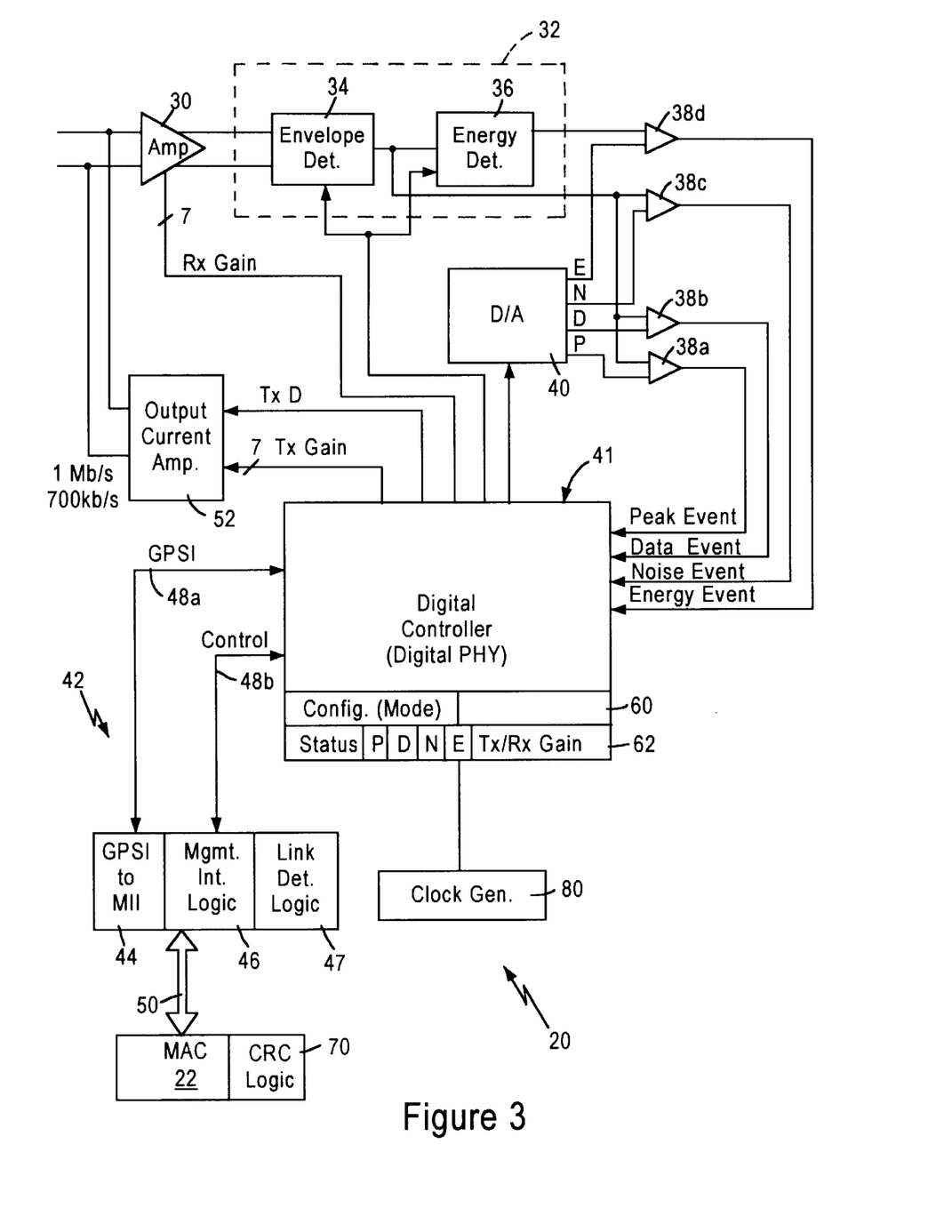
FIG. 3 is a block diagram illustrating the architecture of the physical layer transceiver of FIG. 1 according to an embodiment of the present invention.

FIG. 3 is a block diagram of the physical layer transceiver 20 according to an embodiment of the present invention. As shown in FIG. 3, the physical layer transceiver 20 includes an input amplifier 30 for amplifying analog network received from the telephone medium, such as the network signals shown in FIG. 2C. As described below, the input amplifier 30 has a variable gain controlled by a 7-bit gain signal (RxGain) for amplifying received network signals. The physical layer transceiver 20 also includes a signal conditioning circuit 32 that includes an envelope detection circuit 34 and an energy detection circuit 36. The envelope detection circuit 34 generates the envelope signal 28 in response to the amplified received signal 26. For example, the envelope detector 34 includes an absolute value circuit (e.g., a rectifier circuit) that generates an absolute value signal 39 of the amplified received signal 26, and a low pass filter coupled to the rectifier circuit for filtering out highfrequency components the rectified signal, resulting in the envelope signal 28. The envelope signal 28 is output from the envelope detector 34 and supplied to the energy detector 36. The energy detector 36 includes an integrator which performs the mathematical process of integration over time to produce a signal proportional to energy of the received pulse signal.

As shown in FIG. 3, physical layer transceiver 20 also includes a plurality of slicer circuits 38, and a digital to analog converter 40 for supplying analog threshold signals to the slicer circuits 38. The physical layer transceiver also includes a digital controller 41 configured for controlling the digital analog converter 40 for outputting the threshold signal E, N, D, P, described below.

In particular, the digital controller 41 is configured for controlling the threshold values applied to the slicers 38a, 38b, and 38d based on the signals supplied by the slicers 38 to the digital controller 41. In particular, slicer circuit 38a outputs a peak event signal indicating with respect to time whether the envelope signal 28 exceeds a peak threshold (P) supplied by the digital to analog converter 40 under the control of the digital controller 41. Slicer circuits 38b and 38c output data event signals and noise event signals indicating with respect to time whether the envelope signal 28 exceeds a data transition threshold (D) and a noise threshold (N) respectively. The slicer circuit 38d outputs an energy event signal indicating with respect to time whether the energy signal output by energy detector 36 exceeds an energy threshold (E) supplied by the D/A converter 40.

Hence, the slicer circuits 38a, 38b, and 38c output peak, data transition, and noise event signals indicating with respect to time whether the envelope signal 28 exceeds a peak threshold (P), a data transition threshold (D), and a noise threshold (N), respectively. Slicer 38d, however, outputs an energy event signal indicating with respect to time whether the energy signal from the energy detector 36 exceeds an energy threshold (E).

The digital controller 41 controls the noise, peak and data transition thresholds based on the noise event signals and the peak signals output by the slicers 38c and 38a, respectively, and outputs digital data signals to the media access controller 22 via a media independent interface (MII) 50 based on either the energy event signals or the data event signals.

In particular, the digital controller 41 adjusts the gain of the amplifier 30, and the threshold values P, D, N, and E generated by the D to A converter 40 during an access ID (AID)) interval. AID is a specific identifier which is unique for each network station 12. AID is a series of 8 pulses output from the PHY transceiver 20 of the transmitting station onto the telephone medium 14, where the time intervals between the first pulse and the successive 7 pulses define respective values. For example, assume a second pulse is output by the PHY transceiver 20 following a first pulse at time T1. If T1 equals 66 clock cycles (assuming a 116 nanosecond clock), the corresponding value is 00; if T1 equals 86, 106, or 126 clock cycles, the values are 01, 10, or 11, respectively, where the maximum interval between pulses is 128 clock cycles. The same arrangement is used to detect the values used in time intervals T2, T3, T4, T5, and T7. Hence, the presence of the valid AID can be determined by detecting a first pulse, and detecting a presence of 7 successive pulses using detection windows each having a duration of 128 clock cycles.

According to the disclosed embodiment, AID replaces the preamble conventionally used in 10 Base-T Ethernet (IEEE 802.3) systems. Hence, the digital controller 41 of the present invention uses the AID interval to selectively tune the input amplifier 30 to one of 128 different gain settings selected by the RxGain signal, and set the threshold values used by the slicer circuits 38 by supplying digital threshold values to the D/A converter 40. Once the digital controller 41 has tuned the input amplifier and the threshold values of the slicer circuits 38, the digital controller 41 uses either the data transition event signals from the slicer circuit 38b or the energy event signal from the slicer circuit 38d for recovering the data signals, described below.

The physical layer transceiver also includes a transmitter portion 52 (e.g., an output current amplifier), that converts transmit data (TxD) to an analog network signal. The analog network signal is output at a selected one of 128 output gain values based on the 7-bit transmit gain (TxGain) signal output by the digital controller 41.

As shown in FIG. 3, the physical layer transceiver 20 also includes an output interface 42 including an MII to general purpose serial interface (GPSI) converter 44, management interface logic 46, and buses 48a and 48b. The bus 48a transfers transmit and receive data between the MAC 22 and the digital controller 41 in GPSI format. The converter 44 converts the GPSI format data to nibble-wide data for transfer to the MAC 22 via the MII 50. Similarly, transmit data from the MAC 22 supplied via the MII 50 is converted from nibble-wide data to GPSI format, and supplied to the digital controller 41 via the GPSI data bus 48a.

The output interface 42 also includes a control data bus 48b for transferring configuration data and status information between the digital converter 41 and the management interface logic 46. In particular, the management interface logic 46 is configured for storing configuration data, received from the MAC 22 via the MII 50, into the digital controller 41 at selected control registers 60. Note that the threshold value E for the energy detector slicer circuit 38d may be supplied by the management agent via the MII 50 and set in the configuration registers 60. The digital controller 41 also includes status registers 62 that include, for example, the threshold values for the threshold signals P, D, and E, and the 7-bit input and output amplifier gain control signals (RxGain, TxGain). Hence, a management agent (e.g., a link controller, described below) can access registers 60 and 62 for reading and writing of control information, and reading status information from the status registers 62. The interface 42 also includes link detection logic 47 for determining whether a valid link is detected on the network medium 14. If no valid AID is detected within three successive detection intervals, each having a preferred duration of about 800 milliseconds, the link status is sent to an invalid state. A valid AID may be either a link packet or a preamble for a data packet.

CONTROLLING TRANSMISSION PARAMETERS

Figure 4:
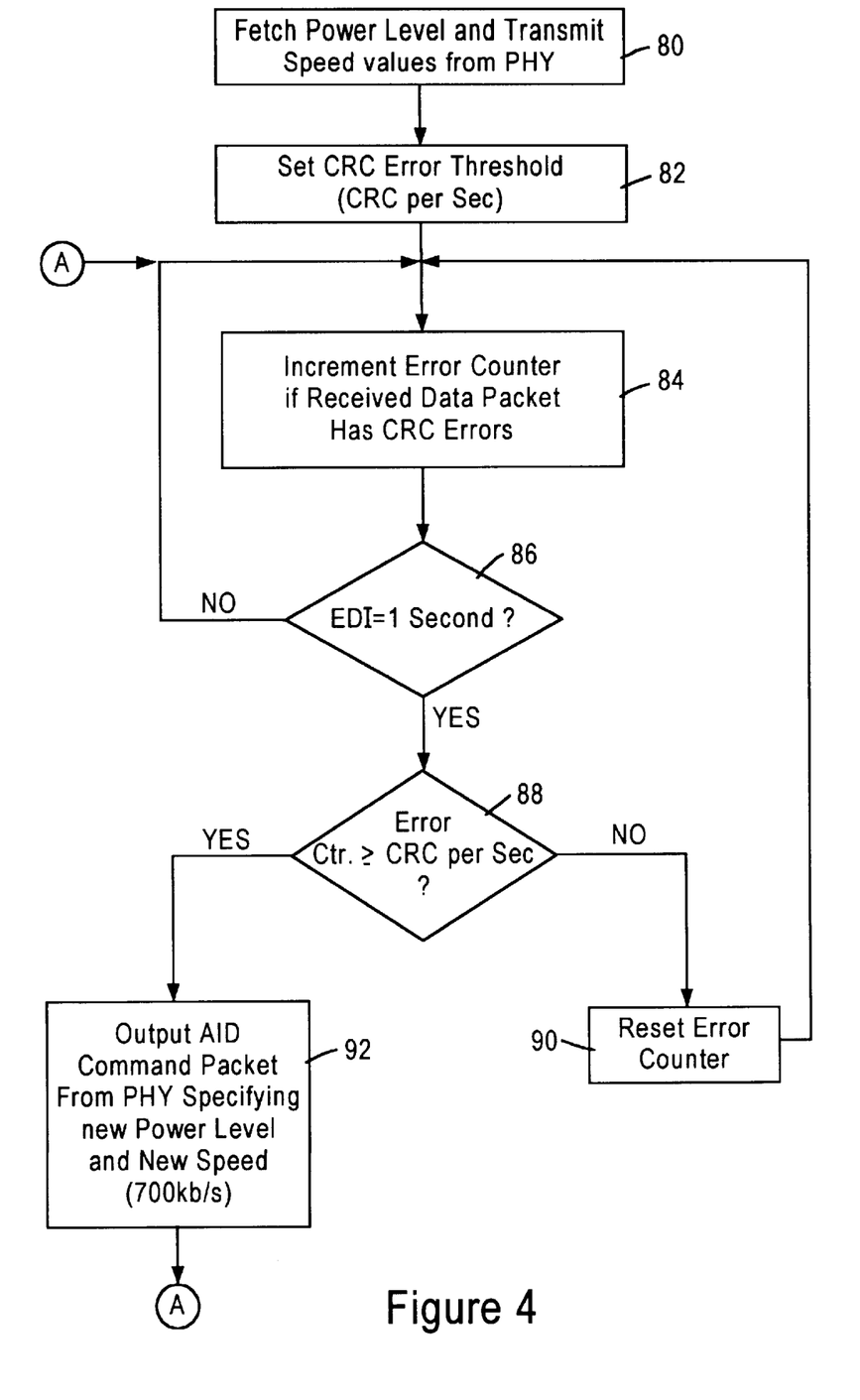
FIG. 4 is a flow diagram illustrating the method of controlling transmission parameters according to an embodiment of the present invention.
Figure 5:
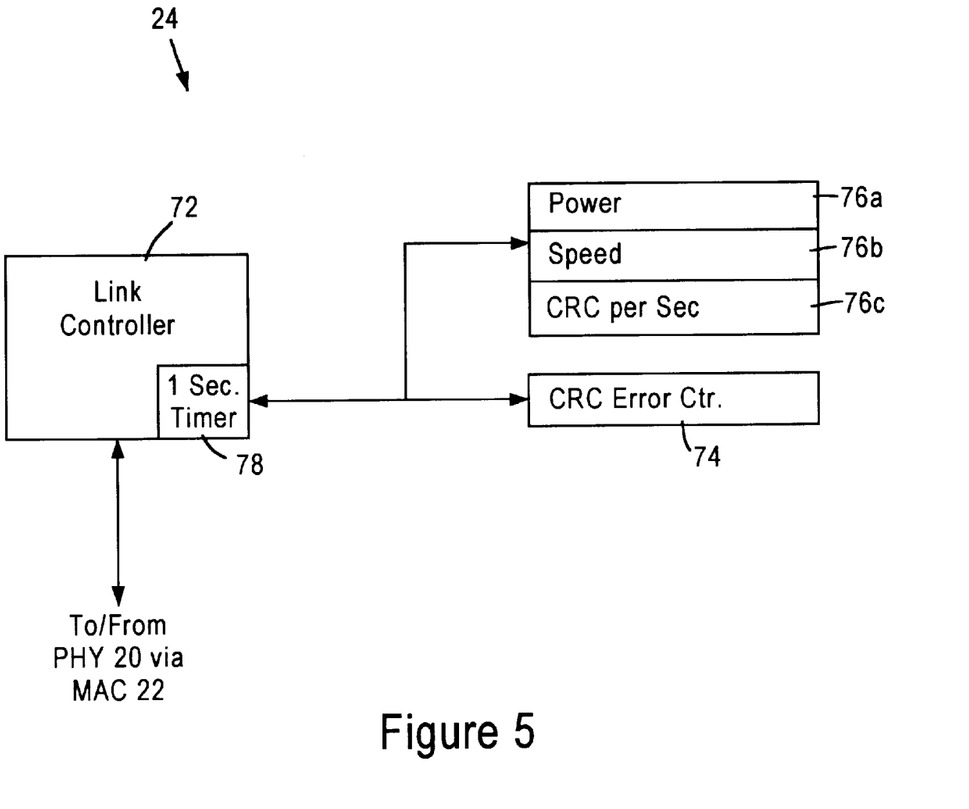
FIG. 5 is a diagram of a link controller within the network station for controlling transmission parameters according to an embodiment of the present invention.

FIG. 4 is a diagram illustrating a method for controlling the transmission parameters of a transmitting network station by a receiving network node according to an embodiment of the present invention. As described above, the physical layer transceiver 20 receives the analog network signals from the telephone line medium 10, and recovers the digital received data. As shown in FIG. 3, the digital data is transferred via the MII 50 to the MAC 22, which includes error checking logic 70, such as a cyclic redundancy check (CRC). The MAC 22 transfers the received data packet plus the corresponding status information specifying whether a CRC error is detected to host memory under the control of OS 24. As shown in FIG. 5, the OS 24 includes a link controller 72, a CRC error counter 74 and memory 76. The link controller 72 may be implemented as driver software executable by a microprocessor within the network station 12, or alternately as a state machine implemented in silicon.

The link controller 72 includes a timer 78, described below, for counting a prescribed time interval of about 1 second.

As shown in FIG. 4, the method begins in step 80 by the link controller 72 fetching the stored link power level (TxGain) and transmit speed values from registers 60 and 62 of the physical layer transceiver 20. In particular, the link controller 72 accesses the transmit gain and transmit speed values via the MII 50 and the control bus 48b. The transmit speed values are selectable between 1 Mb/s and 700 kilobits per second, although other transmission rates may be used. The link controller 72 stores the power level and transmit speed values in memories 76a and 76b, respectively. The link controller 72 then sets in step 82 a CRC error threshold (CRCperSec) to a prescribed value, for example 5, in memory 76c. As recognized in the art, steps 80 and 82 are preferably performed during a configuration mode during initializing of the media access transceiver 23. As shown in FIG. 1, the media access transceiver includes the MAC 22 and the PHY 20.

The link controller 72 then enters a run time state, where data packets are received from the telephone line medium 14 by the physical layer transceiver 20 and transferred to the MAC 22, where the CRC logic 70 checks each of the received data packets for the presence of a CRC error. The link controller 72 then checks each received data packet to determine whether a CRC error is detected, and increments in step 84 the error counter 74 if the received data packet has a CRC error.

During the run time operation of the network station 12, the timer 78 continuously cycles and counts a detection interval of 1 second. If in step 86 the link controller 72 determines that a error detection interval (EDI) does not yet equal 1 second, the link controller continues to monitor for CRC errors in step 84.

If a detection interval of 1 second has passed in step 86, the link controller 72 checks in step 88 whether the accumulated CRC errors in the counter 74 exceed the CRC error threshold (CRCperSec) within the 1 second error detection interval. If the link controller 72 determines that the error counter 74 does not reach the threshold, the error counter is reset in step 90.

However, if the link controller 72 determines that the error counter 74 reaches the prescribed error threshold stored in memory 76c, the link controller 72 sends a command to the MAC 22 to output a AID command packet in step 92. Specifically, the link controller 72 checks the stored power and speed values in memories 76a and 76b, and outputs a new power level or new transmit speed to be included in the AID command packet. The MAC 22 formulates the AID command packet including the new transmit power level and/or new transmit speed, and forwards the AID command packet to the PHY 20 for transmission on the telephone line medium 14.

All network stations that receive the AID command packet recover the supplied transmission parameters, and selectively adjust a transmit data rate and/or the output level to improve reception reliability on the telephone line medium.

According to the disclosed embodiment, a physical layer transceiver has an adjustable transmit gain for adjusting the output power of transmitted analog signals on a telephone line medium. Consequently, a receiving network station can monitor the number of errors in received data packets, and send a AID command packet to the transmitting stations to either increase transmit power or decrease the transmit data rate to improve the bit error rate and received network signals. Hence, network stations communicating via a telephone line medium can interact to improve the reception quality despite the distortion effects caused by the telephone line medium.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A network station configured for sending and receiving network signals between other network stations on a telephone line medium, the network station including a media access transceiver comprising:

a physical layer transceiver;

a media access controller layer; and an operating system layer connected according to Open Systems Interconnection (OSI), said physical layer transceiver being configured for receiving first data packets from the telephone line medium and transmitting second data packets onto the telephone line medium at a selected output gain and transmission speed, the media access controller layer configured for receiving digital signals transferred from the physical layer transceiver and for detecting a presence of an error in the first data packets, and the operating system layer including a link controller configured for causing the physical layer transceiver to output onto the telephone line medium a control data packet based on the detected errors in the first data packets reaching a prescribed threshold, the control data packet causing the other network stations to adjust transmission parameters for reduction of the errors in received data packets.

2. The network station of claim 1, wherein the link controller comprises an error counter for counting a number of the detected errors within a prescribed time interval, the link controller causing the physical layer transceiver to output the control data packet in response to the error counter reaching the prescribed threshold.

3. The network station of claim 2, wherein the link controller further comprises a first register for storing a link speed used to transmit the second data packets and a second register for storing the selected output gain, the link controller outputting at least one of a lower link speed and a higher output gain as a corresponding one of the transmission parameters for transfer in the control data packet by the physical layer transceiver.

4. The network station of claim 1, wherein the physical layer transceiver is configured for recovering the first data packet from the received network signals from the telephone line medium, the physical layer transceiver having first and second registers for storing a link speed and the selected output gain used for transmission of the second data packets, respectively, and the media access controller layer having an error detection circuit configured for detecting said error in the first data packets.

5. The network station of claim 4, wherein the link controller includes third and fourth registers, the link controller configured for copying the link speed and the selected output gain from the first and second registers into the third and fourth registers, respectively, the link controller outputting at least one of a lower link speed and a higher output gain, relative to the stored link speed and the stored selected output gain, to the media access controller for transfer in the control data packet.

6. The network station of claim 1, wherein the physical layer transceiver outputs said control data packet as an access identifier (AID) control packet.

7. The network stations of claim 1, wherein the physical layer transceiver selectively adjusts at least one of the transmission speed and the selected output gain for the second data packets in response to receiving the control data packet from another network station via the telephone line medium.

* * * * *